United States Patent
Wu et al.

(10) Patent No.: US 6,517,787 B2
(45) Date of Patent: Feb. 11, 2003

(54) OZONE GENERATOR WITH REDUCED $NO_x$ AND METHOD THEREOF

(76) Inventors: Ren-Jang Wu, 4F, No. 20, Lane 43, Po-Ai St., Hsinchu (TW); Shen-Jen Chen, 7F, No. 403, Sec. 1, Nei-Hu Rd., Taipei (TW); Yih-Fang Lin, 9F-1, No. 143, San-Ming St., Sanchung, Taipei (TW)

( * ) Notice: Subject to any disclaimer, the term of this patent is extended or adjusted under 35 U.S.C. 154(b) by 0 days.

(21) Appl. No.: 09/875,746

(22) Filed: Jun. 6, 2001

(65) Prior Publication Data

US 2002/0058001 A1 May 16, 2002

Related U.S. Application Data

(63) Continuation-in-part of application No. 09/329,189, filed on Jun. 9, 1999, now abandoned.

(30) Foreign Application Priority Data

Dec. 30, 1998 (CN) ........................................ 87221863 U

(51) Int. Cl.$^7$ ................................................ B01J 19/08
(52) U.S. Cl. .............................. 422/186.09; 422/186.11; 422/186.14; 422/186.19; 422/186.2; 204/176
(58) Field of Search ....................... 422/186.09, 186.14, 422/186.19, 186.2, 186.11; 204/176

(56) References Cited

U.S. PATENT DOCUMENTS

| | | | |
|---|---|---|---|
| 5,587,131 A | | 12/1996 | Malkin et al. |
| 5,632,868 A | * | 5/1997 | Harada et al. ............... 204/176 |
| 5,945,073 A | * | 8/1999 | Ditzler et al. .......... 422/186.19 |

* cited by examiner

*Primary Examiner*—Kishor Mayekar
(74) *Attorney, Agent, or Firm*—Kenyon & Kenyon

(57) ABSTRACT

The present invention discloses an ozone generator with reduced $NO_x$ comprising an air stream generating device; a drying device; an electrical field generating unit; a high-voltage generating device; and a cooling device. The flow velocity of the air stream in the ozone generating area can be increased by the air stream generating device up to 700 s.c.c.m. The temperature in the ozone generating area can be lowered by the cooling system to lower than 10° C. The amount of $NO_x$ produced by the disclosed ozone generator can be reduced substantially.

7 Claims, 2 Drawing Sheets

OZONE GENERATOR WITH REDUCED NO$_X$ AND METHOD THEREOF

CROSS-REFERENCE TO RELATED APPLICATION

This application is a continuation in part of U.S. patent application Ser. No. 09/329,189 filed on Jun. 9, 1999, now abandoned.

BACKGROUND OF THE INVENTION (A) Field of the Invention

The present invention relates to an ozone generator, particularly to an ozone generator which can reduce the amount of NO$_x$ (including NO to and NO$_2$) produced.

(B) Description of Related Art

Basically, ozone is a widely used substance and can be used for sterilization, deodorization, decolorization, air purification, water treatment and food treatment etc. As a consequence, the use of a ozone generator becomes very popular. The principles frequently used for generating ozone in the ozone generators include high-voltage discharge and ultra-violet radiation. Due to cost consideration, a commercially available and industrially applicable ozone generator employing the principle of high-voltage discharge is most popular.

The principle of high-voltage discharge can be briefly described as follows. When air is supplied to an electric field, the oxygen molecule therein will be dissociated into oxygen atoms, as shown in the following formula (A). The oxygen atom then combines with a surrounding oxygen molecule to produce ozone, as shown in the following formula (B). However, the oxygen atom will also combine with a surrounding nitrogen molecule to produce nitric oxide at the same time as producing ozone. The nitride oxide will recombine with ozone and thus generate NO$_2$ (nitrogen dioxide), as shown in the following formulas (C) and (D).

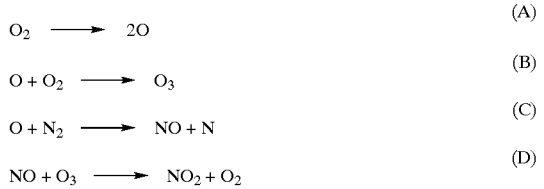

Reaction in formula (D) is very fast. Most of NO can be converted into NO$_2$ in the reaction zone. The concentration of the incidentally produced NO$_2$ is too high. Long-term exposure of 0.05~0.1 ppm NO$_2$ will increase the possibility of having chronic tracheobronchitis, for example, Furthermore, a person could develop respiratory tract obstruction as well as tracheobronchitis if exposed to an environment with a higher concentration (>2.5 ppm) of NO$_2$.

The conventional ozone generators (air purifiers) are, however, unable to control the amount of NO$_2$ produced, and thus a relatively high amount of NO$_2$ is produced therefrom so that human body is adversely affected. It can be shown from the test results illustrated in the table below of various brands of ozone generators.

| No. of Brand | Concentration of NO$_2$/ppm |
|---|---|
| 1 | 1.18 |
| 2 | 4.36 |
| 3 | 1.29 |
| 4 | 3.2 |
| 5 | 2.5 |
| 6 | 3.5 |

SUMMARY OF THE INVENTION

The object of the present invention is to provide an ozone generator with a low production amount of NO$_x$. Basically, the amount of NO$_x$ produced by the present invention is reduced by lowering the temperature of the area where the ozone reaction is conducted, by controlling the voltage, and by increasing the velocity of air passing through.

According to the principle of production of NO$_x$, the higher the temperature of the chemical reaction is, the greater the production of NO$_x$ is. As long as the reaction temperature can be controlled at a lower level, the production of NO$_x$ can be reduced.

Moreover, another factor affecting the production of NO$_x$ is the plate electric field. Since the concentration of oxygen atoms can be controlled by properly controlling the voltage, if the voltage were controlled properly, the production of NO$_x$ could be successfully reduced accordingly. This can be shown from the test results illustrated in the table below.

| Plate Voltage (kV) | Concentration of NO$_2$ (ppm) |
|---|---|
| 2.9 | 1.36 |
| 2.33 | 0.77 |
| 1.9 | 0.56 |
| 1.29 | 0.27 |

Furthermore, from a kinetic point of view, the shorter the reaction time in the plate discharging area is, the less the concentration of NO$_x$ produced. The quicker the flow rate of the air is, the shorter the reaction time is. Thus, increasing the velocity of air passing through can reduce the production of NO$_x$.

To achieve the object mentioned above, the ozone generator with reduced NO$_x$ disclosed in the present invention comprises an air stream generating means for producing an air stream with a specific flow rate; a drying means for dehumidify the air stream; an electrical field generating unit for generating an electrical field, at the downstream side of the air stream of the air stream generating means; a high voltage generating means for providing the electrical field generating unit with a high voltage being capable of generating ozone; and a cooling means for lowering the temperature of the air stream to allow the ozone to be produced in a lowered environment temperature.

With the construction described above, the amount of nitric oxide produced along with ozone will be controlled and will be in such a low concentration as to cause no harm to the human body.

The present invention also provides a method which applies to the ozone generator of the present invention, comprising steps as follows:

(a) introducing an air stream into the ozone generator;

(b) drying the air stream with a drying means, and then accelerating the air stream to a flow rate of more than 700 s.c.c.m. (standard cubic centimeters per minute) with an air stream generating means;

(c) cooling down the air stream to under 10° C. with a cooling means, the cooling means is a coolant or a thermoelectric cooler; and (d) passing the air stream through an electrical field to generate ozone.

These and other objects, features and advantages of the present invention will be more apparent from the illustration of the preferred embodiments taken in conjunction with the accompanying drawing.

DETAILED DESCRIPTION OF THE PRESENT INVENTION

A preferred embodiment is described to illustrate the technical concepts of the present invention, although it must be appreciated that the embodiment is to exemplify the preferred construction of the invention only rather than to limit the scope of protection for the present invention.

Figure 1:
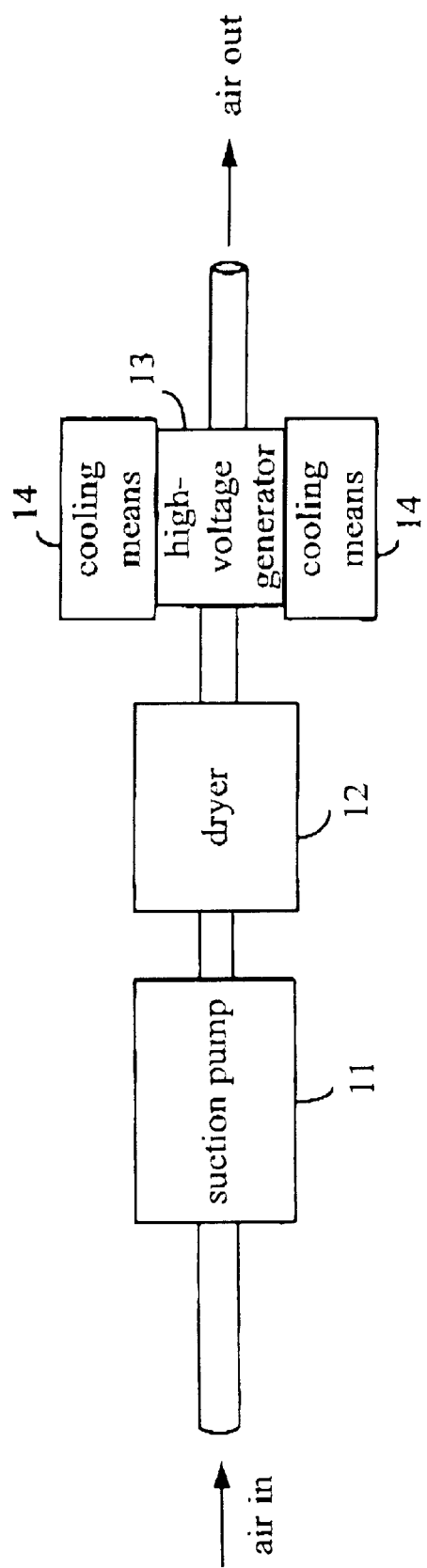
FIG. 1 depicts a schematic block diagram of an ozone generator with reduced $NO_x$ in accordance with the present invention.

FIG. 1 depicts a schematic block diagram of an ozone generator with reduced $NO_x$ in accordance with the present invention. As shown in FIG. 1, the ozone generator of the present invention comprises: a suction pump 11, used as an air stream generating means for generating an air stream; a dryer 12, used as a drying means; a high-voltage generator 13 for producing and supplying a high voltage to electrodes (used as an electrical field generating unit, not shown) to generate an electric field, used as the high-voltage generating means; and a pair of cooling means 14 positioned at upper and lower sides of the high voltage generator for cooling the air stream as well as the environment of the electrical field.

Figure 2:
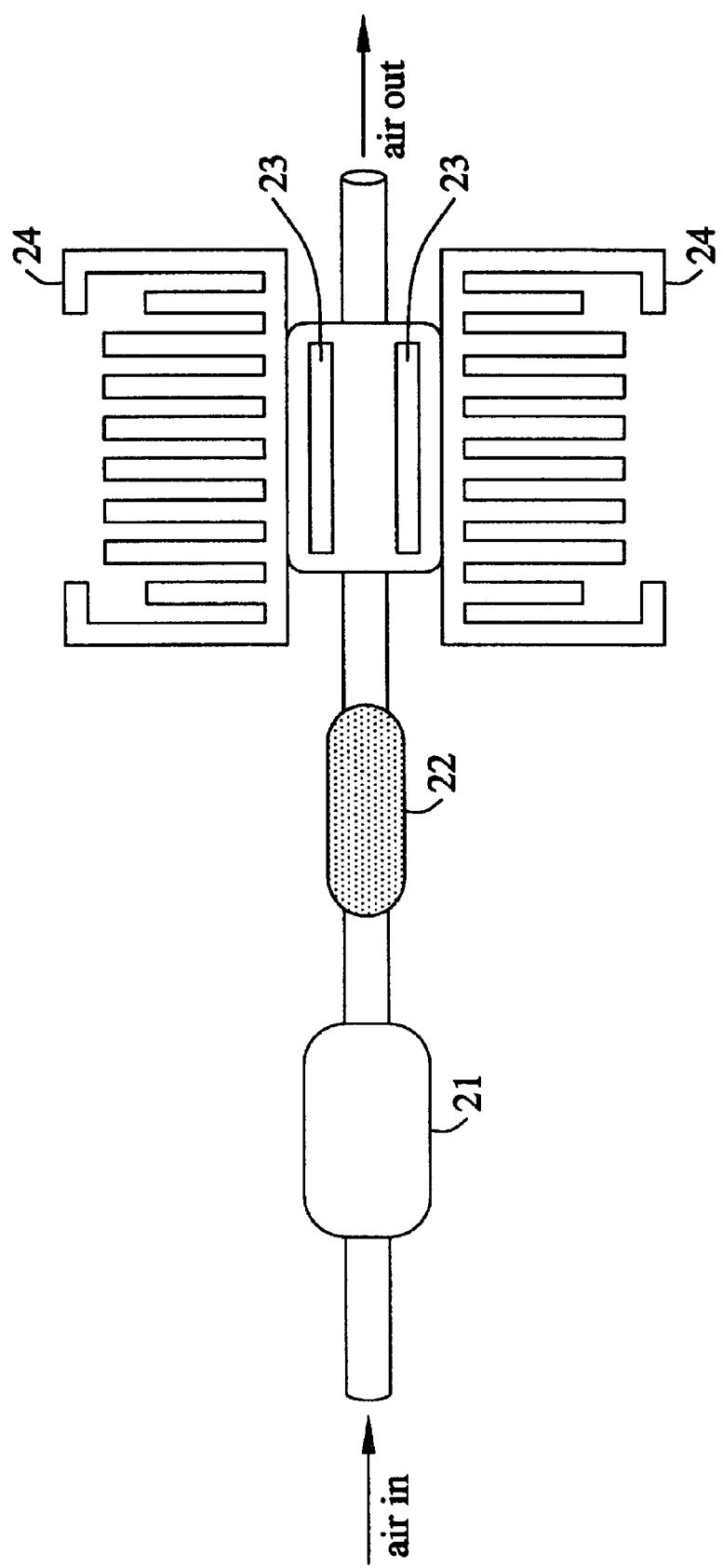
FIG. 2 illustrates a schematic structure of the ozone generator in accordance with the present invention.

FIG. 2 depicts a schematic structure of the ozone generator in accordance with the present invention. An air stream is drawn into the ozone generator of the present invention by a suction pump 21, the suction pump not only draws a flow of air stream into the ozone generator, but also accelerates the air stream to a speed of more than 700 s.c.c.m. The fast moving air stream then flows inside a closed channel to a dryer 22 to dehumidify the air stream by an absorbent material stuffed inside the dryer 22. After passing through the dryer 22, the air stream then goes into another chamber where two mutual parallel electrodes 23 are located horizontally for the air stream to be passed through, the pair of electrodes generate an electric field when powered by a high voltage generator (not shown), the electrodes are ceramic plates coated with a silver layer and a protective layer. In addition, two thermoelectric coolers 24 are located at a upper and a lower position of the chamber with electrodes, the cooler itself is made of Cu in a toothlike shape for effectively cooling down the air stream. When the cooled and fast moving air stream passes through the zone between the two electrodes, the high voltage discharge reaction described above occurs and produces ozone thereof; due to the low temperature and high speed of the air stream, the $NO_x$ produced with ozone is significantly reduced.

In the ozone generator of this invention, a suction pump is used to draw air in and accelerate the drawn air so as to produce an air stream with a flow rate of more than 700 s.c.c.m. The dryer is used to reduce the moisture in the air stream. The high-voltage generator comprises an adjustable high-voltage transformer (not shown) and a power supply control circuit (not shown). The generator is used to generate a high voltage and send it to the pair of electrodes, which in turn generates an electrical field between the pair of electrodes such that ozone will be produced when the air stream flows through. The cooling means is a thermoelectric cooler (TE-cooler) which utilizes the change of current to control the direction of heat flow in the thermoelectric cooler such that the temperature in one of the thermoelectric plates of the cooler rises while another plate thereof decreases. By means of the above, the air stream will be cooled to below 10° C. due to a contact with the cooled-down thermoelectric plate which is inserted into the air stream. Therefore, the air stream will be cooled to a low temperature before it passes through the electrical field, and thereby lowering the temperature of the space in the vicinity of the electrical field to allow ozone to be produced in an environment of low temperature. In addition, the air stream flows through a closed channel, from the location at which the air stream is accelerated to the location at which ozone is produced, thus a specific flow rate of the air stream keeps in a cooled down environment.

The effect of the construction described above is further shown as follows. Table 1 shows the relationship between the flow rates of the air stream and the concentrations of the produced nitric oxide. It can be seen from the experimental data shown in Table 1 that the greater the flow rate of the air stream is, the smaller the concentration of nitric oxide is. As a result, the installation of the air stream generating means contributes to the reduction of nitric oxide. Table 2 shows relationships between the environmental temperature and the concentration of $NO_x$. It can be seen from the data shown therein that the lower the environmental temperature is, the lower the concentration of nitric oxide is. Therefore, using a cooling means to facilitate the production of ozone in a cooled-down environment contributes greatly to the reduction of $NO_x$.

TABLE 1

| Flow Rates of Air Stream (SCCM) | Concentrations of $NO_2$ (ppm) |
| --- | --- |
| 708 | 1.2 |
| 1416 | 0.73 |
| 1888 | 0.56 |
| 2265 | 0.48 |

TABLE 2

| Temperature (° C.) | Concentrations of $NO_x$ (ppm) | Note |
| --- | --- | --- |
| 22.1 | 6.52 | Relative Humidity = 0.5% RH |
| 18.6 | 4.93 | |
| −.09 | 1.15 | |
| −3.5 | 0.97 | |

Accordingly, it is a fact that the amount of $NO_x$ produced with the ozone is reduced due to the provision of a cooling means to cool-down the air stream either before or during the production of the electrical field. Moreover, the amount of $NO_x$ will be firer reduced due to the use of the suction pump to increase the flow rate of the air stream and thereby decreasing the reaction time of the air stream in the discharge area. Additionally, the use of the dryer obtains a lower humidity, prevents moisture from condensing on the electrode plates, and raises the efficiency of the cooler. In view of the above, the present invention actually reduces the amount of $NO_x$ produced.

Additionally, while the preferred embodiment of the present invention has been exemplified herein above for illustration, the various modification and changes that are made without departing from the technologic ideas and spirit of the invention are within the claimed scope.

What is claimed is:

1. An ozone generator with reduced $NO_x$ comprising:

air stream generating means for producing an air stream with a flow rate more than 700 standard cubic centimeters per minute in a channel;

drying means for dehumidifying the air stream coming from the air stream generating means;

an electrical field generating unit for generating an electrical field at the downstream side of the air stream with respect to the air stream generating means and drying means:

high-voltage generating means for supplying the electrical field generating unit with a high voltage to generate ozone; and cooling means aocated at an upper position and a lower position of the electrical field generating unit, for lowering the temperature of the air stream to under 10° C. to reduce the production of $NO_x$.

2. The ozone generator of claim 1, wherein the air stream generating means is a suction pump.

3. The ozone generator of claim 1, wherein the cooling means is a thermoelectric cooler and positioned at both sides of the high voltage generating means.

4. A method for producing ozone with reduced $NO_x$, comprising steps as follows:

(a) introducing an air stream into an ozone generator;

(b) accelerating a flow rate of the air stream to more than 700 standard cubic centimeters per minute with an air stream generating means;

(c) cooling down the air stream to under 10° C. with a cooling means; and (d) passing the air stream through an electrical field.

5. The method according to claim 4, wherein step (c) further comprises a step of drying the air stream before cooling down the air stream.

6. The method according to claim 4, wherein step (c) applies a coolant to cool down the air stream.

7. The method according to claim 4, wherein the cooling means includes a thermoelectric cooler.

* * * * *

UNITED STATES PATENT AND TRADEMARK OFFICE
CERTIFICATE OF CORRECTION

PATENT NO. : 6,517,787 B2
DATED : February 11, 2003
INVENTOR(S) : Ren-Jang Wu et al.

It is certified that error appears in the above-identified patent and that said Letters Patent is hereby corrected as shown below:

<u>Title page,</u>
Item [73], Assignee, should read -- Industrial Technology Research Institute --.

Signed and Sealed this

Twentieth Day of April, 2004

JON W. DUDAS
*Acting Director of the United States Patent and Trademark Office*